(12) United States Patent
Lesage et al.

(10) Patent No.: US 8,679,608 B2
(45) Date of Patent: *Mar. 25, 2014

(54) AIRTIGHT MULTILAYER LAMINATE FOR A PNEUMATIC OBJECT

(75) Inventors: Pierre Lesage, Clermont-Ferrand (FR); Vincent Abad, Chamalieres (FR); Emmanuel Custodero, Chamalieres (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 165 days.

This patent is subject to a terminal disclaimer.

(21) Appl. No.: 13/132,803

(22) PCT Filed: Nov. 30, 2009

(86) PCT No.: PCT/EP2009/008503
§ 371 (c)(1), (2), (4) Date: Sep. 16, 2011

(87) PCT Pub. No.: WO2010/063427
PCT Pub. Date: Jun. 10, 2010

(65) Prior Publication Data
US 2012/0003413 A1 Jan. 5, 2012

(30) Foreign Application Priority Data
Dec. 3, 2008 (FR) ...................................... 08 58243

(51) Int. Cl.
*B32B 25/08* (2006.01)
*B60C 5/14* (2006.01)

(52) U.S. Cl.
USPC ........... 428/36.6; 152/510; 152/511; 428/519

(58) Field of Classification Search
CPC ........ B60C 1/0008; B60C 5/14; B32B 27/08; C08L 23/283
USPC .................. 428/36.6, 519; 152/502, 510, 511
See application file for complete search history.

(56) References Cited

U.S. PATENT DOCUMENTS

| 2006/0194898 A1 * | 8/2006 | Sanda, Jr. ...................... 523/166 |
| 2006/0229402 A1 | 10/2006 | Varma |
| 2010/0175804 A1 * | 7/2010 | Lesage et al. ................. 152/511 |

FOREIGN PATENT DOCUMENTS

| EP | 1 561 783 | 8/2005 |
| EP | 1 987 962 | 11/2008 |

(Continued)

*Primary Examiner* — Gwendolyn Blackwell
*Assistant Examiner* — Susan R Dye
(74) *Attorney, Agent, or Firm* — Cozen O'Connor

(57) ABSTRACT

A multilayer elastomer laminate that is impermeable to inflation gases, which is capable of adhering to a diene elastomer composition and which can be used in an inflatable article provided with such a diene composition, said laminate comprising at least two superposed elastomer layers (phr signifying parts by weight per hundred parts of elastomer, in each elastomer composition considered): as a gastight first layer, a first elastomer composition comprising more than 50 phr of a copolymer containing polystyrene and polyisobutylene blocks; as an adhesive second layer, a second elastomer composition comprising more than 50 phr of an unsaturated thermoplastic styrene copolymer and optionally a liquid plasticizing agent at a content from 0 to less than 100 phr. This multilayer laminate possesses very good impermeability properties and a reduced hysteresis compared to layers based on butyl rubber, and also a high adhesion to a diene elastomer third layer.

26 Claims, 1 Drawing Sheet

(56) References Cited

FOREIGN PATENT DOCUMENTS

| FR | 2 910 478 | 6/2008 |
| WO | WO 2008/154996 | 12/2008 |
| WO | WO 2008145276 A1 * | 12/2008 |

* cited by examiner

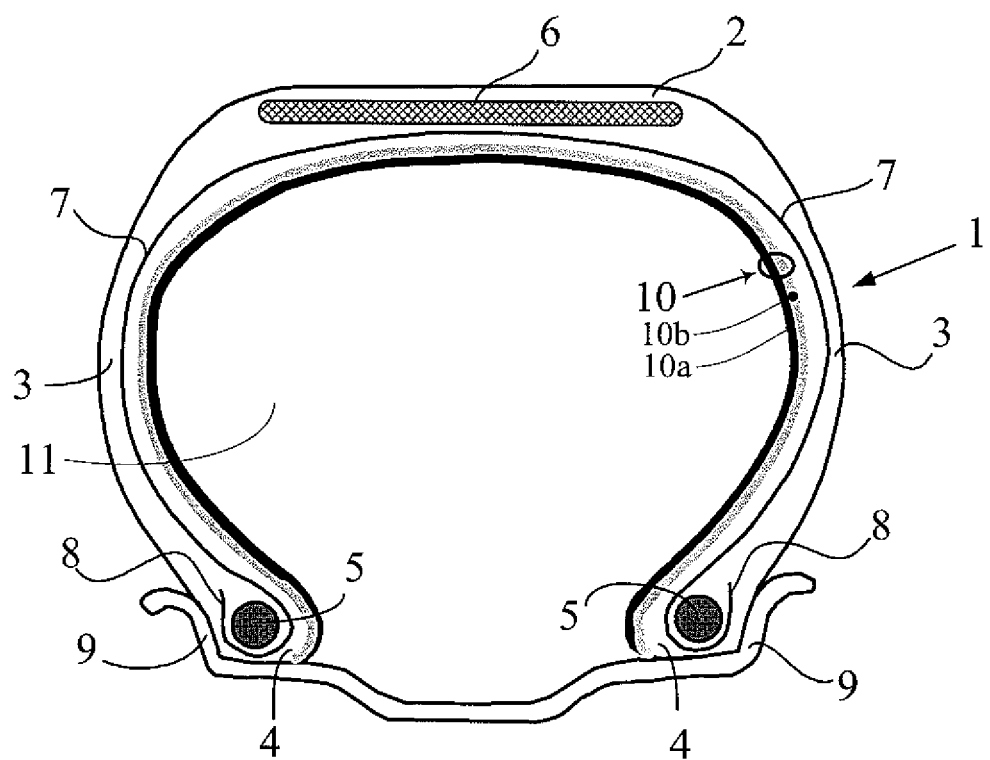

AIRTIGHT MULTILAYER LAMINATE FOR A PNEUMATIC OBJECT

RELATED APPLICATION

This is a U.S. National Phase Application under 35 USC 371 of International Application PCT/EP2009/008503, filed on Nov. 30, 2009.

This application claims the priority of French patent application Ser. No. 08/58243 filed Dec. 3, 2008, the entire content of which is hereby incorporated by reference.

FIELD OF THE INVENTION

The present invention relates to "inflatable" articles, i.e. by definition, to articles that assume their usable shape when they are inflated with air or with an equivalent inflation gas.

The invention relates more particularly to the gastight layers or laminates that ensure the impermeability of these inflatable articles, in particular that of pneumatic tires.

BACKGROUND OF THE INVENTION

In a conventional pneumatic tire of the "tubeless" type (that is to say of the type without an inner tube), the radially internal face comprises an airtight layer (or more generally a layer that is impermeable to any inflation gas) which enables the pneumatic tire to be inflated and kept under pressure. Its impermeability properties enable it to guarantee a relatively low rate of pressure loss, making it possible to keep the tire inflated, in the normal operating state, for a sufficient time, normally several weeks or several months. It also has the role of protecting the carcass reinforcement from diffusion of air coming from the internal space of the tire.

This role of gastight inner layer or "inner liner" is today fulfilled by compositions based on butyl rubber (copolymer of isobutylene and isoprene), long renowned for their excellent impermeability properties.

However, one well-known drawback of compositions based on butyl rubber or elastomer is that they suffer large hysteresis losses. Furthermore, it is known that over a wide temperature range, large hysteresis losses can degrade the rolling resistance of pneumatic tires.

SUMMARY OF THE INVENTION

One object of the present invention is to reduce the hysteresis of these airtight inner layers, and therefore in fine the fuel consumption of motor vehicles.

However, the Applicants have discovered, during their research, a specific multilayer laminate, based on thermoplastic elastomers, which fulfils such an objective while imparting excellent impermeability properties.

One object of the present invention relates to an elastomer laminate that is impermeable to inflation gases, which is capable of adhering to a diene elastomer composition, wherein said laminate comprises at least two superposed thermoplastic elastomer layers (phr signifying parts by weight per hundred parts of elastomer, in each respective elastomer composition):

as a gastight first layer, a first elastomer composition comprising more than 50 phr of a copolymer containing polystyrene and polyisobutylene blocks;
as an adhesive second layer, a second elastomer composition comprising more than 50 phr of an unsaturated thermoplastic styrene copolymer and optionally a liquid plasticizing agent at a content from 0 to less than 100 phr.

Compared to a butyl rubber, the above styrene elastomers have the major advantage, due to their thermoplastic nature, of being able to be worked as is in the molten (liquid) state, and consequently of offering a possibility of simplified processing.

Another aspect of the invention relates to the use of such a laminate in inflatable articles, particularly inflatable articles made of rubber such as pneumatic tires or inner tubes, especially inner tubes for a pneumatic tire.

Another aspect of the present invention relates to the use of the above laminate in pneumatic tires intended to be fitted on motor vehicles of the passenger type, SUV ("Sport Utility Vehicle") type, two-wheel vehicles (especially motorcycles) and aircraft, such as industrial vehicles chosen from vans, heavy vehicles (i.e. underground trains, buses, heavy road transport vehicles such as lorries, towing vehicles, trailers, off-road vehicles such as agricultural or civil-engineering vehicles), and other transport or handling vehicles.

Another aspect of the invention relates, per se, to any inflatable article, in particular a pneumatic tire, comprising a multilayer laminate according to an embodiment of the invention.

BRIEF DESCRIPTION OF THE SINGLE DRAWING

The invention and its advantages will be readily understood in light of the description and the exemplary embodiments that follow, and also the single FIGURE relating to these embodiments that shows schematically, in radial cross section, a pneumatic tire with radial carcass reinforcement incorporating a laminate in accordance with the invention.

I. DETAILED DESCRIPTION OF THE SINGLE DRAWING

In the present description, unless otherwise indicated, all the percentages (%) indicated are % by weight.

Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

Finally, the expression "phr" signifies parts by weight per hundred parts of total elastomer (or "rubber", the two terms being considered to be synonyms), i.e. of the total of the elastomers present in each elastomer composition considered.

The multilayer laminate of the invention therefore has the essential feature of comprising at least two superposed layers:

as a gastight first layer, a first elastomer composition comprising more than 50 phr of a copolymer containing polystyrene and polyisobutylene blocks (referred to as "first thermoplastic styrene copolymer" or "first TPS copolymer");
as an adhesive second layer, a second elastomer composition comprising more than 50 phr of an unsaturated thermoplastic styrene copolymer (referred to as "second thermoplastic styrene copolymer" or "second TPS copolymer") and optionally a liquid plasticizing agent at a content from 0 to less than 100 phr.

In other words, the content of each TPS copolymer, in its respective layer, is within a range from more than 50 phr to 100 phr. By virtue of its adhesive second layer, this laminate is capable of adhering strongly to a diene elastomer composition; it can particularly be used in an inflatable article provided with such a diene elastomer composition intended to be in contact with the laminate.

It will firstly be recalled that thermoplastic styrene elastomers (also known as TPS elastomers) are thermoplastic elastomers that are in the form of styrene-based block copolymers. Having a structure intermediate between thermoplastic polymers and elastomers, they are composed, in a known manner, of hard polystyrene blocks linked by flexible elastomer blocks, for example polybutadiene, polyisoprene, or poly(ethylene-butylene) blocks. They are often triblock elastomers with two hard segments linked by a flexible segment. The hard and flexible segments may be in a linear, star or branched configuration.

These TPS elastomers may also be diblock elastomers with a single hard segment linked to a flexible segment. Typically, each of these segments or blocks contains at least more than 5, generally more than 10 base units (for example styrene units and isoprene units for a styrene/isoprene/styrene block copolymer).

Regarding the second TPS copolymer, it will also be recalled that the expression "unsaturated TPS copolymer" should be understood to mean a TPS copolymer that is provided with ethylenically unsaturated groups, i.e. comprises (conjugated or unconjugated) carbon-carbon double bonds. The expression "saturated TPS copolymer" is understood to mean a TPS copolymer that comprises no ethylenically unsaturated groups, (i.e. no carbon-carbon double bonds).

I-1. First (Gastight) Layer

As the first layer, which is airtight or more generally impermeable to any inflation gas, use is made of a first elastomer composition comprising more than 50 phr of a copolymer containing polystyrene and polyisobutylene blocks (or "first TPS copolymer").

The expression "copolymer containing polystyrene and polyisobutylene blocks" should be understood in the present application as any thermoplastic styrene copolymer comprising at least one polystyrene block (i.e. one or more polystyrene blocks) and at least one polyisobutylene block (i.e. one or more polyisobutylene blocks), with which other saturated or unsaturated blocks (for example polyethylene and/or polypropylene blocks) and/or other monomer units may or may not be combined.

It has been observed that the presence of this first TPS copolymer, especially SIB or SIBS, gives the laminate excellent impermeability properties while significantly reducing the hysteresis compared to conventional layers based on butyl rubber.

This copolymer containing polystyrene and polyisobutylene blocks is in particular chosen from the group consisting of styrene/isobutylene (abbreviated to "SIB") diblock copolymers, styrene/isobutylene/styrene (abbreviated to "SIBS") triblock copolymers and mixtures of these SBIB and SIBS copolymers, which are, by definition, completely saturated.

Copolymers containing polystyrene and polyisobutylene blocks such as SIB or SIBS copolymers are known and are commercially available, sold for example by KANEKA under the name "SIBSTAR" (e.g. "Sibstar 103T", "Sibstar 102T", "Sibstar 073T" or "Sibstar 0721" for SIBSs; "Sibstar 042D" for SIBs). They have, for example, been described, and also their synthesis, in patent documents EP 731 112, U.S. Pat. No. 4,946,899 and U.S. Pat. No. 5,260,383. They were firstly developed for biomedical applications, then described in various applications specific to TPE elastomers, as varied as medical equipment, motor vehicle parts or parts for electrical goods, sheaths for electrical wires, sealing or elastic parts (see, for example, EP 1 431 343, EP 1 561 783, EP 1 566 405 and WO 2005/103146). However, to the knowledge of the Applicants, no application is known in the field of inflatable articles, particularly pneumatic tires for motor vehicles.

The gastight layer described above could optionally comprise elastomers other than the first TPS copolymer, in a minority amount (less than 50 phr). Such additional elastomers could be, for example, diene elastomers such as natural rubber or a synthetic polyisoprene, a butyl rubber or even other saturated thermoplastic styrene elastomers, within the limit of the compatibility of their microstructures. In such a case and preferably, the content of first TPS copolymer in the first airtight composition is greater than 70 phr, in particular within a range from 80 to 100 phr.

However, according to one particularly preferred embodiment, the first TPS copolymer, in particular SIB or SIBS, is the only thermoplastic elastomer, and more generally the only elastomer, present in the gastight layer; consequently, in such a case, its content is equal to 100 phr.

The first TPS copolymer described above, in particular SIB or SIBS, is sufficient by itself for the function of impermeability to gases with respect to the inflatable articles in which they are used to be fulfilled, in the first elastomer layer.

However, this first TPS copolymer may be combined with, as a plasticizing agent, an extender oil (or plasticizing oil), the role of which is to facilitate the processing, particularly the integration into an inflatable article via a reduction of the modulus and an increase of the tackifying power of the gastight layer and therefore of the laminate of the invention.

This optional extender oil is preferably used at a content of less than 100 phr, namely less than 100 parts by weight per hundred parts of total elastomer (i.e., first TPS copolymer above plus additional elastomer where appropriate) present in the first gastight layer.

Any extender oil may be used, preferably one having a weakly polar character, capable of extending or plasticizing elastomers, especially thermoplastic elastomers.

At ambient temperature (23° C.), these oils, which are relatively viscous, are liquids (i.e. as a reminder, substances having the capability of eventually taking the form of their container), as opposed especially to resins which are by nature solids.

Preferably, the extender oil is chosen from the group consisting of polyolefin oils (i.e. those resulting from the polymerization of olefins, monoolefins or diolefins), paraffinic oils, naphthenic oils (of low or high viscosity), aromatic oils, mineral oils and mixtures of these oils.

Preferably polybutene oils, in particular polyisobutylene (abbreviated to "PIB") oils, are used, which have demonstrated the best compromise of properties compared with the other oils tested, especially with oils of paraffinic type.

Examples of polyisobutylene oils include those sold in particular by Univar under the name "Dynapak Poly" (e.g. "Dynapak Poly 190"), by BASF under the names "Glissopal" (e.g. "Glissopal 1000") or "Oppanol" (e.g. "Oppanol B12") and by INEOS Oligomer under the name "Indopol H1200". Paraffinic oils are sold for example by Exxon under the name "Telura 618" or by Repsol under the name "Extensol 51".

The number-average molecular weight ($M_n$) of the extender oil is preferentially between 200 and 25 000 g/mol, more preferentially still between 300 and 10 000 g/mol. For excessively low $M_n$ values, there is a risk of the oil migrating to the outside of the composition, whereas excessively high $M_n$ values may result in this composition becoming too stiff.

An $M_n$ value between 350 and 4000 g/mol, in particular between 400 and 3000 g/mol, proves to constitute an excellent compromise for the intended applications, in particular for use in a pneumatic tire.

The number-average molecular weight ($M_n$) of the extender oil is determined by SEC, the specimen being firstly dissolved in tetrahydrofuran to a concentration of about 1 g/l and then the solution is filtered on a filter of 0.45 μm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the name "STYRAGEL HT6E" is used. The injected volume of the polymer specimen solution is 100 μl. The detector is a WATERS 2410 differential refractometer and its associated software for handling the chromatographic data is the WATERS MILLENNIUM system. The calculated average molecular weights are relative to a calibration curve obtained with polystyrene standards.

A person skilled in the art will know, in the light of the description and the exemplary embodiments that follow, how to adjust the quantity of extender oil according to the particular usage conditions of the gastight elastomer layer, in particular of the inflatable article in which it is intended to be used.

If an extender oil is used, it is preferred that its extender content is greater than 5 phr, in particular between 5 and 100 phr. Below the indicated minimum, the gastight layer and therefore the multilayer laminate run the risk of having too high a rigidity for certain applications, whereas above the recommended maximum there is a risk of the laminate having insufficient cohesion and of loss of impermeability which may be detrimental depending on the application considered.

For these reasons, in particular for use of the laminate in a pneumatic tire, the extender oil content is preferably greater than 10 phr, especially between 10 and 90 phr, more preferably still greater than 20 phr, especially between 20 and 80 phr.

Preferably, the airtight layer described previously has a thickness of greater than 0.05 mm, more preferably between 0.1 and 10 mm (for example from 0.2 to 2 mm).

It will be readily understood that, depending on the specific fields of application and on the dimensions and pressures involved, the method of implementing the invention may vary, the airtight first layer in fact having several preferential thickness ranges. Thus, for example, in the case of pneumatic tires for passenger vehicles, they may have a thickness of at least 0.3 mm, preferentially between 0.5 and 2 mm. According to another example, in the case of pneumatic tires for heavy or agricultural vehicles, the preferential thickness may be between 1 and 3 mm. According to another example, in the case of pneumatic tires for vehicles in the civil engineering field or for aircraft, the preferential thickness may be between 2 and 10 mm.

I-2. Second (Adhesive) Layer

As an adhesive second layer use is made, in combination with the preceding gastight first layer, of a second elastomer composition, the essential feature of which is to comprise more than 50 phr (that is to say from more than 50 phr to 100 phr) of the unsaturated second TPS copolymer.

It has been observed that the presence of this second layer based on the (unsaturated) second TPS copolymer, in the laminate of the invention, makes it possible to greatly improve the adhesion of the latter to a diene rubber composition such as those customarily used in inflatable articles such as pneumatic tires. By way of example, one such diene rubber composition is, for example, a composition based on natural rubber such as those that are commonly used for the carcass reinforcements of pneumatic tires, which are generally, and in a known manner, in direct contact with the impermeable inner layer of such pneumatic tires.

According to one preferred embodiment, the second TPS copolymer is a copolymer comprising styrene blocks and diene blocks, these diene blocks being in particular isoprene or butadiene blocks. More preferably, this unsaturated second TPS elastomer is chosen from the group consisting of styrene/butadiene (SB), styrene/isoprene (SI), styrene/butadiene/butylene (SBB), styrene/butadiene/isoprene (SBI), styrene/butadiene/styrene (SBS), styrene/butadiene/butylene/styrene (SBBS), styrene/isoprene/styrene (SIS) and styrene/butadiene/isoprene/styrene (SBIS) block copolymers and mixtures of these copolymers.

According to another particularly preferred embodiment of the invention, the content of second TPS copolymer is greater than 70 phr, more preferably within a range from 80 to 100 phr. The unsaturated second TPS copolymer described previously may advantageously constitute the whole of the elastomer matrix of the adhesive second composition (present in this case at a content of 100 phr).

Unsaturated TPS elastomers such as, for example, SBS, SIS or SBBS are well known and are commercially available, for example from Kraton under the name "Kraton D" (e.g., products D1161, D1118, D1116, D1163 for examples of SIS and SBS elastomers), from Dynasol under the name "Calprene" (e.g., products C405, C411, C412 for examples of SBS elastomers) or else from Asahi under the name "Tuftec" (e.g., product P1500 for an example of an SBBS elastomer).

Besides the second TPS copolymer, the adhesive second composition may or may not comprise, depending on the particular applications employed, a liquid plasticizing agent (which is liquid at ambient temperature, i.e. 23° C.), the role of which is to plasticize the unsaturated second TPS copolymer and thus give more flexibility to the adhesive layer and also to the laminate.

If such a liquid plasticizing agent is used, it is present at a content between 0 and 100 phr, preferentially between 5 and 50 phr, in particular within a range from 10 to 40 phr, ranges of values which represent an excellent compromise between ease of processing of the adhesive layer, on the one hand, and effectiveness of adhesion, on the other hand, of the adhesive layer to the other (gastight) layer of the laminate of the invention.

According to one particular embodiment of the invention, this liquid plasticizing agent may consist of an extender oil as described in the preceding section, especially chosen from the group consisting of polybutene oils such as polyisobutylene oil, paraffinic oils and mixtures of these oils.

According to another particular embodiment of the invention, this liquid plasticizing agent may consist of a liquid elastomer, that is to say an elastomer having a low molecular weight, typically of less than 50 000, preferentially of less than 30 000 g/mol. It may be, in particular, a liquid diene elastomer such as IR, SBR, BR.

The thickness of the adhesive layer, preferentially greater than 0.01 mm, may vary to a wide extent, for example between 0.01 and 0.5 mm, as a function, in particular, of the method of deposition of said adhesive layer on the other gastight layer of the laminate. Advantageously, according to one particular embodiment of the invention, the adhesive layer is coextruded with the gastight layer.

According to another preferred embodiment of the invention, the weight content of styrene, in each (first and second) TPS copolymer is between 5% and 50%. Below the indicated minimum, the thermoplastic nature of the elastomers runs the risk of being substantially reduced, whereas above the recommended maximum the elasticity of the laminate may be adversely affected. For these reasons, the styrene content is more preferably between 10 and 40%, in particular between 15 and 35%.

The term "styrene" "stirene" should be understood in the present description as meaning any monomer based on unsubstituted or substituted styrene; among the substituted styrenes mention may be made, for example, of methylstyrenes (for example, α-methylstyrene, β-methylstyrene, p-methylstyrene, tert-butylstyrene), chlorostyrenes (for example monochlorstyrene, dichlorostyrene).

It is preferable for the $T_g$ (glass transition temperature, measured according to ASTM D3418) of each (first and second) TPS copolymer to be below −20° C., in particular below −40° C. A $T_g$ value above these minimum temperatures may reduce the performances of the laminate when used at a very low temperature; for such a use, the $T_g$ of the TPS copolymers is more preferably still below −50° C.

The number-average molecular weight (denoted by $M_n$) of each (first and second) TPS elastomer is preferably between 30 000 and 500 000 g/mol, more preferably between 40 000 and 400 000 g/mol. Below the minimum values indicated, the cohesion between the elastomer chains, especially due to the optional dilution of the latter by an extender oil or other liquid plasticizer, runs the risk of being adversely affected. Moreover, too high a molecular weight $M_n$ may be detrimental as regards the flexibility of the two layers. Thus, it has been observed that a value lying within a range of 50 000 to 300 000 g/mol was particularly suitable, especially for use of the multilayer laminate in a pneumatic tire.

The number-average molecular weight ($M_n$) of the TPS elastomers is determined in a known manner by size exclusion chromatography (SEC). The specimen is firstly dissolved in tetrahydrofuran to a concentration of about 1 g/l; then the solution is filtered on a filter of 0.45 μm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series having the trade names STYRAGEL (HMW7, HMW6E and two HT6E) is used. The injected volume of the polymer specimen solution is 100 μl. The detector is a WATERS 2410 differential refractometer and its associated software for handling the chromatographic data is the WATERS MILLENNIUM system. The calculated average molecular weights are relative to a calibration curve obtained with polystyrene standards.

The polydispersity index $I_p$ (N.B.: $I_p = M_w/M_n$ where $M_w$ is the weight-average molecular weight) of the TPS elastomers is preferably less than 3, more preferably $I_p$ is less than 2.

I-3. Platy Filler

The use of a platy filler, having a volume content preferably of greater than 5%, in particular of between 5% and 50%, may advantageously make it possible to further reduce the permeability coefficient (therefore to increase the impermeability) of the first elastomer composition without excessively increasing its modulus, which makes it possible to retain the ease of integrating the gastight layer into the inflatable article.

Fillers referred to as platy fillers are well known to a person skilled in the art. They have been used, in particular, in pneumatic tires for reducing the permeability of conventional gastight layers based on butyl rubber. In these layers based on butyl rubber, they are generally used at relatively low contents, which do not usually exceed 10 to 15 phr (see, for example, patent documents US 2004/0194863, WO 2006/047509).

They are generally in the form of stacked plates, platelets, sheets or foliates with a relatively pronounced anisometry. Their aspect ratio (F=L/E) is generally greater than 3, more often greater than 5 or than 10, L representing the length (or larger dimension) and E the average thickness of these platy fillers, these averages being calculated by number. Aspect ratios reaching several tens or even hundreds are common. Their average length is preferably greater than 1 μm (that is to say that they are then platy fillers known as micron-scale platy fillers), typically between a few μm (for example 5 μm) and a few hundred μm (for example 500 or even 800 μm).

Preferably, the platy fillers used in accordance with the invention are chosen from the group consisting of graphites, phyllosilicates and mixtures of such fillers. Among the phyllosilicates, mention will especially be made of clays, talcs, micas, kaolins, these phyllosilicates possibly being unmodified or modified for example by a surface treatment; as examples of such modified phyllosilicates, mention may especially be made of micas covered with titanium oxide, and clays modified by surfactants ("organoclays").

Use is preferably made of platy fillers having a low surface energy, that is to say that are relatively apolar, such as those chosen from the group consisting of graphites, talcs, micas and mixtures of such fillers, the latter possibly being modified or unmodified, more preferably still from the group composed of graphites, talcs and mixtures of such fillers. Among the graphites mention may especially be made of natural graphites, expanded graphites or synthetic graphites.

As examples of micas, mention may be made of the micas sold by CMMP (Mica-MU®, Mica-Soft®, Briomica® for example), vermiculites (especially the Shawatec® vermiculite sold by CMMP or the Microlite® vermiculite sold by W. R. Grace), modified or treated micas (for example, the Iriodin® range sold by Merck). As examples of graphites, mention may be made of the graphites sold by Timcal (Timrex® range). As examples of talcs, mention may be made of the talcs sold by Luzenac.

The platy fillers described above are preferably used at a high content, of greater than 5%, more preferably at least equal to 10% by volume of first elastomer composition. Such a volume content typically corresponds, taking into account the average density of the platy fillers used (typically between 2.0 and 3.0) and that of the TPS elastomers used, to a weight content preferably of greater than 20 phr, more preferably at least equal to 40 phr.

In order to further increase the impermeability of the first TPS elastomer layer, it is possible to use a still higher content of platy filler, at least equal to 15% or even 20% by volume, which typically corresponds to weight contents at least equal to 50 phr or even 80 phr. Weight contents of greater than 100 phr are even advantageously possible.

The platy filler content is however preferably less than 50% by volume (typically less than 500 phr), the upper limit starting from which problems of increase in the modulus, embrittlement of the composition, difficulties in dispersing the filler and in processing, not to mention a possible degradation of the hysteresis, may be encountered.

The introduction of platy fillers into the first thermoplastic elastomer composition will be able to be carried out according to various known processes, for example by compounding in solution, by bulk compounding in an internal mixer, or else by compounding via extrusion.

I-4. Various Additives

The laminate of the invention may comprise various additives, especially those usually present in the airtight layers and/or the adhesive layers known to a person skilled in the art, for example, reinforcing fillers such as carbon black or silica, non-reinforcing or inert fillers, plasticizers other than those mentioned above, protective agents such as antioxidants or antiozonants, UV stabilizers, colorants that can advantageously be used for colouring the compositions, various processing aids or other stabilizers, or else promoters capable of further promoting the adhesion of the laminate to the rest of the structure of an inflatable article for example.

Besides the TPS copolymers described above, the multilayer laminate of the invention could also comprise, still in a minority weight fraction relative to the first and second TPS elastomers, polymers other than elastomers, such as for example thermoplastic polymers compatible with these TPS elastomers.

The multilayer laminate described previously is a compound that is solid (at 23° C.) and elastic, which is especially characterized, owing to its specific formulation, by a very high flexibility and very high deformability. In particular, according to one preferred embodiment of the invention, each of the two layers of the laminate has a secant modulus in extension, at 10% elongation, which is less than 2 MPa, more preferably less than 1.5 MPa (especially less than 1 MPa). This quantity is measured at first elongation (that is to say without an accommodation cycle) at a temperature of 23° C., with a pull rate of 500 mm/min (ASTM D412 standard), and normalized to the initial cross section of the test specimen.

I-5. Use of the Laminate in an Inflatable Article

The laminate of the invention can be used in any type of "inflatable" article, i.e. by definition, any article that assumes its usable shape when it is inflated with air. As examples of such inflatable articles, mention may be made of inflatable boats, balloons or balls used for games or sports.

Said laminate is particularly suitable for use in an inflatable article, whether a finished or semi-finished product, made of rubber, most particularly in a pneumatic tire for a motor vehicle, such as a two-wheeled, passenger or industrial vehicle, or a non-motorized vehicle, such as a bicycle.

Such a laminate is preferentially placed on the inner wall of the inflatable article, completely or at least partly covering it, but it may also be completely integrated into its internal structure.

Preferably, the multilayer laminate of the invention has a total thickness that is greater than 0.05 mm, in particular between 0.1 mm and 15 mm, more preferably between 0.5 and 10 mm.

Compared with a customary impermeable layer based on butyl rubber, the multilayer laminate of the invention has the advantage of exhibiting a significantly lower hysteresis, and therefore of offering the pneumatic tires a reduced rolling resistance, as is demonstrated in the following exemplary embodiments.

II. EXEMPLARY EMBODIMENTS OF THE INVENTION

The multilayer laminate of the invention can be advantageously used in the pneumatic tires of all vehicle types, particularly in tires for passenger vehicles which are capable of running at a very high speed or tires for industrial vehicles, such as heavy vehicles.

As an example, the single appended FIGURE shows very schematically (not drawn to a specific scale) a radial cross section of a pneumatic tire according to the invention intended for a passenger vehicle.

This pneumatic tire 1 has a crown 2 reinforced by a crown reinforcement or belt 6, two sidewalls 3 and two beads 4, each of these beads 4 being reinforced with a bead wire 5. The crown 2 is surmounted by a tread (not shown in this schematic FIGURE). A carcass reinforcement 7 is wound around two bead wires 5 in each bead 4, the upturn 8 of this reinforcement 7 lying for example towards the outside of the pneumatic tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the circumferential mid-plane (the plane perpendicular to the axis of rotation of the pneumatic tire, which is located at mid-distance of the two beads 4 and passes through the middle of the crown reinforcement 6).

The pneumatic tire 1 is characterized in that its inner wall includes a multilayer laminate (10) comprising at least two layers (10a, 10b), said laminate being airtight owing to its first layer (10a) placed on the side of the internal cavity 11, and highly adhesive to the rest of the structure of the pneumatic tire (for example its carcass reinforcement) owing to its radially outermost second layer (10b). In accordance with a preferred embodiment of the invention, the two layers (10a, 10b) cover substantially the entire inner wall of the pneumatic tire, extending from one sidewall to the other, at least as far as the rim flange when the pneumatic tire is in the fitted position.

In this example, the layer 10a (having a thickness of around 0.75 mm) comprises an SIBS elastomer ("Sibstar 102T" with a styrene content of around 15%, a $T_g$ of around −65° C. and an average molecular weight $M_n$ of around 90 000 g/mol), 28 phr (i.e. 5% by volume of the first layer) of a platy filler ("Mica-Soft 15") and a polyisobutylene extender oil ("Indopol H1200") having a weight content of around 65 phr.

The layer 10a was prepared as follows. The three constituents (SIBS, platy filler and oil) were mixed conventionally, using a twin-screw extruder (L/D=40), at a temperature typically above the melting point of the composition (around 190° C.). The extruder used comprised a first feed (hopper) for the SIBS, a second feed (hopper) for the platy filler and finally a pressurized liquid injection pump for the polyisobutylene extender oil; it was provided with a die enabling the product to be extruded to the desired dimensions.

The adhesive second layer 10b itself consisted of a single unsaturated SIS elastomer ("Kraton D1161" with a styrene content of around 15% and a $T_g$ of around −60° C.), with no other additive. The two layers 10a and 10b were lastly coextruded at a temperature of 220° C., to finally obtain the multilayer laminate of the invention, before incorporating the latter into the pneumatic tire.

The pneumatic tire provided with its multilayer laminate (10) as described above may be produced before or after vulcanization (or curing).

In the first case (i.e., before curing of the pneumatic tire), the two-layer laminate is simply applied in one go, in a conventional manner, to the desired location; the vulcanization is then carried out conventionally. A possible manufacturing variant, for a person skilled in the art of pneumatic tires, would consist for example during a first step, in laying down the airtight layer (10a) directly onto a building drum, then the adhesive layer (10b), in the form of two layers of suitable thickness, before covering the laminate thus formed with the rest of the structure of the pneumatic tire in the uncured state, according to manufacturing techniques well known to a person skilled in the art.

In the second case (i.e. after curing of the pneumatic tire), the multilayer laminate, comprising for example its own vulcanization system, is applied to the inside of the pneumatic tire cured by any appropriate means, for example by bonding.

In the following examples, the impermeability properties were first analysed on test specimens of compositions based on butyl rubber on the one hand and on the laminate according to the invention on the other hand (with and without PIB extender oil, as regards the gastight first layer based on SIBS).

For this analysis, a rigid-wall permeameter was used, placed in an oven (temperature of 60° C. in the present case), equipped with a pressure sensor (calibrated in the range of 0 to 6 bar) and connected to a tube equipped with an inflation valve. The permeameter may receive standard test specimens in disc form (for example having a diameter of 65 mm in the present case) and with a uniform thickness which may range up to 3 mm (0.5 mm in the present case). The pressure sensor is connected to a National Instruments data acquisition card (0-10 V analogue four-channel acquisition) which is connected to a computer that carries out a continuous acquisition with a frequency of 0.5 Hz (1 point every two seconds). The permeability coefficient (K) is measured from the linear regression line (average over 1000 points) giving the slope α of the pressure loss through the test specimen tested as a function of the time, after stabilization of the system, that is to say after obtaining a steady state during which the pressure decreases linearly as a function of the time.

Firstly, it is noted that the laminate in which the airtight layer comprised only the SIBS elastomer (i.e. with no extender oil or other additive) had a very low permeability coefficient, substantially equal to that of the standard composition based on butyl rubber. This already constitutes a remarkable result for such a laminate.

As already indicated, if a certain loss of impermeability is accepted in return, the addition of an extender oil to the gastight first layer advantageously makes it possible to facilitate the integration of the multilayer laminate into the inflatable article, via a lowering of the modulus and an increase of the tackifying power of said laminate.

Thus, by using 65 phr of extender oil in the gastight first layer, it was observed that the permeability coefficient was increased (and therefore the airtightness reduced) by a factor of around 2.5 in the presence of a conventional oil such as paraffinic oil, whereas this coefficient was only increased by a factor of 1.5 in the presence of a PIB oil ("Indopol H1200"), a factor of increase that is actually not very detrimental for use in a pneumatic tire; this is how the combination of the first TPS copolymer and polybutene oil such as PIB oil has proved to offer the best compromise of impermeability properties for the multilayer laminate of the invention. Moreover, by adding a platy filler as indicated previously (28 phr in this example), it was advantageously possible to compensate for the loss of impermeability due to the addition of the extender oil.

Moreover, adhesion tests (peel tests) were carried out in order to test the ability of the laminate to adhere, after curing, to a diene elastomer layer, more specifically to a standard rubber composition for a pneumatic tire carcass reinforcement, based on (peptized) natural rubber and on N330 carbon black (65 parts per hundred parts of natural rubber), comprising in addition the customary additives (sulphur, accelerator, ZnO, stearic acid, antioxidant, cobalt naphtenate).

It was observed that the use of the adhesive second layer (SIS elastomer) made it possible to greatly improve, by a factor of greater than three, or even more in many cases, the adhesive forces between the gastight first layer and the natural rubber composition.

Following the above laboratory tests, pneumatic tires according to the invention, of the passenger vehicle type (dimension 195/65 R15) were manufactured; their inner wall being covered with a laminate (10a, 10b) having a total thickness of 1.05 mm (laid on a building drum, before manufacture of the rest of the tire), then the tires were vulcanized.

Said laminate was formed from an airtight first layer based on SIBS (100 phr) and on platy filler, the whole assembly being extended with 65 phr of PIB oil, and from a superposed adhesive second layer, consisting of the SIS elastomer alone (100 phr), as described above.

These pneumatic tires according to the invention were compared with control pneumatic tires (Michelin "Energy 3" brand) comprising a conventional airtight layer, of the same thickness, based on butyl rubber. The rolling resistance of the pneumatic tires was measured on a flywheel, according to the ISO 87-67 (1992) method.

It was observed that the pneumatic tires of the invention had a rolling resistance that was reduced very significantly, and unexpectedly for a person skilled in the art, by almost 4% relative to the control pneumatic tires.

In conclusion, the multilayer laminate of the invention has very good impermeability properties and a reduced hysteresis compared to layers based on butyl rubber, and also a particularly high adhesion to a third diene elastomer layer such as natural rubber. The invention thus offers the designers of pneumatic tires the opportunity of reducing the fuel consumption of motor vehicles fitted with such tires.

The invention claimed is:

1. An elastomer laminate that is impermeable to inflation gases, said laminate comprising at least two superposed thermoplastic styrene elastomer layers, wherein:
   a first gastight layer is a first elastomer composition comprising more than 50 phr of a first copolymer containing polystyrene and polyisobutylene blocks; and
   a second adhesive layer is a second elastomer composition comprising more than 50 phr of an unsaturated thermoplastic styrene second copolymer and optionally a liquid plasticizing agent at a content from 0 to less than 100 phr.

2. The laminate according to claim 1, wherein the first copolymer is chosen from the group consisting of styrene/isobutylene copolymers, styrene/isobutylene/styrene copolymers and mixtures of these copolymers.

3. The laminate according to claim 2, wherein the first copolymer is a styrene/isobutylene/styrene copolymer.

4. The laminate according to claim 1, wherein the second copolymer is a copolymer comprising styrene blocks and diene blocks.

5. The laminate according to claim 4, wherein the diene blocks are isoprene or butadiene blocks.

6. The laminate according to claim 5, wherein the second copolymer is chosen from the group consisting of styrene/butadiene (SB), styrene/isoprene (SI), styrene/butadiene/butylene (SBB), styrene/butadiene/isoprene (SBI), styrene/butadiene/styrene (SBS), styrene/butadiene/butylene/styrene (SBBS), styrene/isoprene/styrene (SIS) and styrene/butadiene/isoprene/styrene (SBIS) block copolymers and mixtures of these copolymers.

7. The laminate according to claim 1, wherein the content of first copolymer in the first composition is greater than 70 phr.

8. The laminate according to claim 1, wherein the content of second copolymer in the second composition is greater than 70 phr.

9. The laminate according to claim 1, wherein each of the first and second copolymers comprise between 5 and 50% by weight of styrene.

10. The laminate according to claim 1, wherein the glass transition temperature of each of the first and second copolymers is below −20° C.

11. The laminate according to claim 1, wherein the number-average molecular weight of each of the first and second copolymers is between 30 000 and 500 000 g/mol.

12. The laminate according to claim 1, wherein the first gastight layer comprises an extender oil.

13. The laminate according to claim 12, wherein the extender oil is chosen from the group consisting of polyolefin oils, paraffinic oils, naphthenic oils, aromatic oils, mineral oils and mixtures of these oils.

14. The laminate according to claim 13, wherein the extender oil is a polybutene oil.

15. The laminate according to claim 14, wherein the polybutene oil is a polyisobutylene oil.

16. The laminate according to claim 12, wherein the number-average molecular weight of the extender oil is between 200 and 25 000 g/mol.

17. The laminate according to claim 12, wherein the content of extender oil is greater than 5 phr.

18. The laminate according to claim 17, wherein the content of extender oil is between 5 and 100 phr.

19. The laminate according to claim 1, wherein the content of liquid plasticizing agent in the second elastomer composition is between 5 and 50 phr.

20. The laminate according to claim 1, wherein the liquid plasticizing agent of the second elastomer composition is an oil chosen from the group consisting of polyolefin oils, paraffinic oils, naphthenic oils, aromatic oils, mineral oils and mixtures of these oils.

21. The laminate according to claim 1, wherein the liquid plasticizing agent of the second elastomer composition is a liquid elastomer.

22. The laminate according to claim 1, wherein the first gastight layer comprises a platy filler.

23. An article comprising a laminate according to claim 1.

24. The article according to claim 23, wherein the laminate is placed on the inner wall of the inflatable article.

25. The article according to claim 23, wherein said article is a pneumatic tire.

26. The article according to claim 23, wherein said article is an inner tube.

* * * * *